(12) United States Patent
    Kato et al.

(10) Patent No.: US 12,649,667 B1
(45) Date of Patent: Jun. 9, 2026

(54) METHOD FOR PRODUCING HYDROCYANIC ACID AND DEVICE FOR PRODUCING HYDROCYANIC ACID

(71) Applicant: MITSUBISHI CHEMICAL CORPORATION, Tokyo (JP)

(72) Inventors: Shimpei Kato, Tokyo (JP); Yoshikazu Sawada, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 19/064,497

(22) Filed: Feb. 26, 2025

Related U.S. Application Data

(63) Continuation of application No. 17/221,387, filed on Apr. 2, 2021, now abandoned, which is a continuation of application No. PCT/JP2020/007074, filed on Feb. 21, 2020.

(30) Foreign Application Priority Data

Feb. 27, 2019    (JP) .................................. 2019-034279

(51) Int. Cl.
    *C01C 3/02*          (2006.01)
    *B01J 4/00*          (2006.01)

*B01J 8/18*          (2006.01)
*B01J 8/24*          (2006.01)

(52) U.S. Cl.
    CPC ............. *C01C 3/0241* (2013.01); *B01J 4/001* (2013.01); *B01J 8/1827* (2013.01); *B01J 8/24* (2013.01); *B01J 2204/002* (2013.01); *B01J 2208/00893* (2013.01)

(58) Field of Classification Search
    CPC ....... C01C 3/0241; B01J 4/001; B01J 8/1827; B01J 8/24; B01J 2204/002; B01J 2208/00893
    See application file for complete search history.

(56)          References Cited

U.S. PATENT DOCUMENTS 5,965,765 A * 10/1999 Kurihara .................... B01J 8/34
                                                                558/320
6,057,471 A *  5/2000 Nakamura ............ C07C 253/26
                                                                558/324
2021/0238049 A1* 8/2021 Kato .................... B01J 23/8877

* cited by examiner

*Primary Examiner* — Anthony J Zimmer
*Assistant Examiner* — Syed T Iqbal
(74) *Attorney, Agent, or Firm* — Morgan, Lewis & Bockius LLP

(57)          ABSTRACT

The present disclosure provides a device for producing hydrocyanic acid and method of use thereof.

17 Claims, 3 Drawing Sheets

METHOD FOR PRODUCING HYDROCYANIC ACID AND DEVICE FOR PRODUCING HYDROCYANIC ACID

BACKGROUND OF THE INVENTION

Field of the Invention

The present invention relates to a method for producing hydrocyanic acid and a device for producing hydrocyanic acid.

Description of the Related Art

As an industrial method for producing hydrocyanic acid, there is a method of ammoxidating methanol. In an ammoxidation reaction of methanol, an optimum temperature range of the reaction is generally narrow, and a calorific value due to the reaction is large. Therefore, a fluidized bed reactor is often used for the ammoxidation reaction of methanol because of its good temperature controllability and high productivity that enable it to treat a raw material gas of a high concentration.

JP H10-152463 A discloses a method of supplying an oxygen-containing gas from a supply port which is at a bottom thereof to form a fluidized bed having a fluidized solid density of 50 to 300 kg/m$^3$ and a gas flow velocity of 1 m/s or less at the supply port of the raw material when ammoxidating a raw material such as methanol with a fluidized bed reactor, and of supplying the raw material from another supply port (a pore opening portion of a gas disperser) at a predetermined position above the supply port of the oxygen-containing gas.

SUMMARY OF INVENTION

Technical Problem

When methanol is ammoxidated through vapor phase contact in the presence of a metal oxide catalyst, a region in the fluidized bed reactor where oxygen is relatively deficient with respect to methanol and a large amount of methanol remains unreacted and a region where oxygen is present in relative excess to methanol and produces a large amount of by-products are formed, and as a result, a yield of hydrocyanic acid throughout the fluidized bed reactor becomes low.

An object of the present invention is to provide a method for producing hydrocyanic acid, which can improve a yield of the hydrocyanic acid in a vapor phase contact ammoxidation reaction of methanol and a device for producing hydrocyanic acid.

Solution to Problem

As a result of repeated examinations by the present inventors, it was found that a yield of hydrocyanic acid can be improved by setting a density of pores of the disperser that supplies a raw material gas containing methanol into the fluidized bed reactor, that is, the number of pores per unit cross-sectional area of the fluidized bed reactor, within a specific range, and thereby the present invention was completed.

JP H10-152463 does not disclose the number of pore opening portions of a gas disperser.

The present invention has the following aspects.

[1] A method for producing hydrocyanic acid, including a step of obtaining hydrocyanic acid by a vapor phase contact ammoxidation reaction by supplying a raw material gas containing methanol in a fluidized bed reactor through a raw material gas disperser disposed inside the fluidized bed reactor, and bringing the methanol into contact with ammonia and oxygen in the presence of a metal oxide catalyst, in which the raw material gas disperser has one or more pores for releasing the raw material gas into the fluidized bed reactor, and the number of pores per unit cross-sectional area of the fluidized bed reactor is 10 to 45 pieces/m$^2$.

[2] The method for producing hydrocyanic acid according to [1], in which the number of pores per unit cross-sectional area of the fluidized bed reactor is 20 to 35 pieces/m$^2$.

[3] The method for producing hydrocyanic acid according to [1] or [2], in which a diameter of the pore is 1 to 12 mm.

[4] The method for producing hydrocyanic acid according to any one of [1] to [3], in which the raw material gas disperser is a pipe type disperser, a rectifier pipe is attached to the raw material gas disperser at a position having the pores, and the raw material gas released from the pore is supplied into the fluidized bed reactor through the rectifier pipe.

[5] The method for producing hydrocyanic acid according to any one of [1] to [4], in which the raw material gas contains methanol and ammonia.

[6] The method for producing hydrocyanic acid according to any one of [1] to [5], in which an oxygen-containing gas is supplied from a bottom of the fluidized bed reactor.

[7] The method for producing hydrocyanic acid according to any one of [1] to [6], in which the metal oxide catalyst contains at least iron, antimony, phosphorus, and vanadium.

[8] The method for producing hydrocyanic acid according to [7], in which the number of moles of vanadium is equal to or more than 0.6 when the number of moles of iron in the metal oxide catalyst is 10.

[9] The method for producing hydrocyanic acid according to [8], in which the metal oxide catalyst has a composition represented by the following Formula (I).

$$Fe_aSb_bP_cV_dMo_eCu_fW_gA_hE_iG_jO_k(SiO_2)_l \qquad (I)$$

Here, Fe, Sb, P, V, Mo, Cu, W, O, and Si represent iron, antimony, phosphorus, vanadium, molybdenum, copper, tungsten, oxygen, and silicon, respectively, A represents at least one element selected from the group consisting of Mg, Zn, La, Ce, Al, Cr, Mn, Co, Ni, Bi, U, and Sn, E represents at least one element selected from the group consisting of B and Te, G represents at least one element selected from the group consisting of Li, Na, K, Rb, Cs, Ca, and Ba, subscripts a, b, c, d, e, f, g, h, i, j, k and 1 represent atomic ratios, and when a=10 is assumed, b=12 to 30, c=1 to 30, d=0.6 to 3, e=0 to 0.3, f=0 to 5, g=0 to 3, h=0 to 6, i=0 to 5, j=0 to 3, l=0 to 200, and k is an oxygen atomic ratio required to satisfy the atomic valence of each of the elements excluding silicon.

[10] The method for producing hydrocyanic acid according to any one of [1] to [6], in which the metal oxide catalyst contains at least molybdenum and bismuth.

[11] The method for producing hydrocyanic acid according to [10], in which the metal oxide catalyst has a composition represented by the following Formula (II).

$$Mo_mBi_nFe_oJ_pL_qM_rQ_sO_t(SiO_2)_u \qquad (II)$$

Here, Mo, Bi, Fe, O, and Si represent molybdenum, bismuth, iron, oxygen, and silicon, respectively, J represents at least one element selected from the group consisting of Ni, Co, Zn, Mg, Mn, and Cu, L represents at least one element selected from the group consisting of La, Ce, Pr, Nd and Sm, M represents at least one element selected from the group consisting of Li, Na, K, Rb, and Cs, Q represents at least one element selected from the group consisting of Ca, Sr, Ba, Cd, Ti, Zr, V, Nb, Ta, Cr, W, Ge, Sn, Y, Al, Ga, Ru, Rh, Pd, Re, Os, Ir, Pt, Ag, B, P, Sb, and Te, subscripts m, n, o, p, q, r, s, t, u represent atomic ratios, and when m=12 is assumed, n=0.1 to 5, o=0.1 to 10, p=2 to 12, q=0.01 to 5, r=0.01 to 2, s=0 to 10, u=20 to 200, and t is an oxygen atomic ratio required to satisfy the atomic valence of each of the elements excluding silicon.

[12] The method for producing hydrocyanic acid according to any one of [1] to [11], in which the methanol is brought into contact with ammonia and oxygen at a temperature of 300° C. to 500° C.

[13] The method for producing hydrocyanic acid according to any one of [1] to [12], in which the methanol is brought into contact with ammonia and oxygen at a pressure of 0 to 200 kPa (gauge pressure).

[14] A device for producing hydrocyanic acid by a vapor phase contact ammoxidation reaction by bringing methanol into contact with ammonia and oxygen in the presence of a metal oxide catalyst, the device including: a fluidized bed reactor configured to accommodate the metal oxide catalyst and to perform the vapor phase contact ammoxidation reaction, one or more raw material gas dispersers disposed in the fluidized bed reactor, and a raw material gas supply unit configured to supply a raw material gas containing methanol to the raw material gas disperser, in which the raw material gas disperser has one or more pores for releasing the raw material gas into the fluidized bed reactor, and the number of pores per unit cross-sectional area of the fluidized bed reactor is 10 to 45 pieces/m².

[15] The device for producing hydrocyanic acid according to [14], in which the raw material gas contains methanol and ammonia.

[16] The device for producing hydrocyanic acid according to [14] or [15], further including an oxygen-containing gas supply unit configured to supply an oxygen-containing gas from a bottom of the fluidized bed reactor.

Advantageous Effects of Invention

According to the method for producing hydrocyanic acid and the device for producing hydrocyanic acid of the present invention, it is possible to improve a yield of hydrocyanic acid in a vapor phase contact ammoxidation reaction of methanol.

DETAILED DESCRIPTION OF THE INVENTION

Hereinafter, a method for producing hydrocyanic acid and a device for producing hydrocyanic acid of the present invention will be described with reference to the accompanying drawings, showing embodiments.

A numerical value range represented by using "-" includes the numerical values at both ends within the range.

Figure 1:
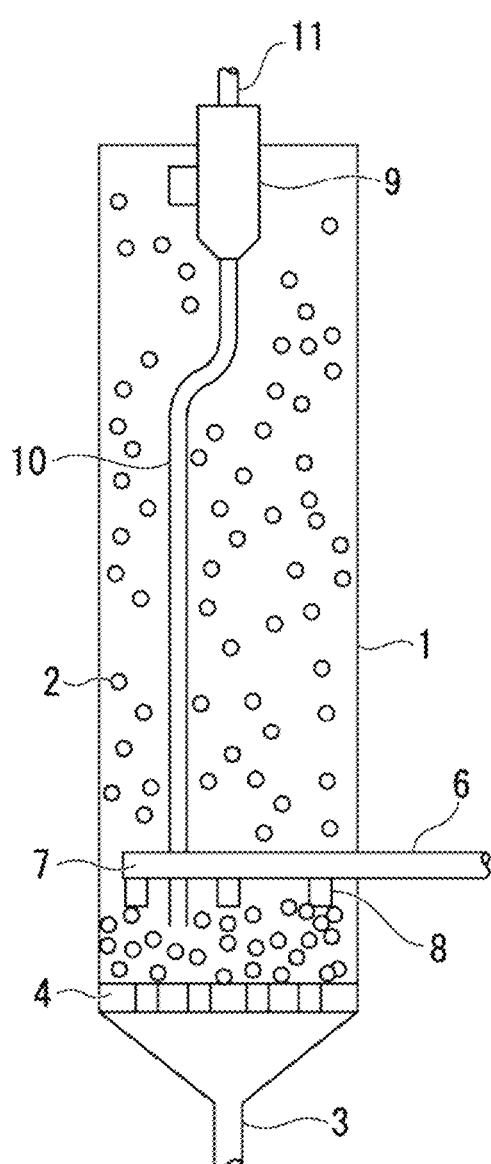
FIG. 1 is a schematic configuration diagram of a device for producing hydrocyanic acid according to an embodiment.
Figure 2:
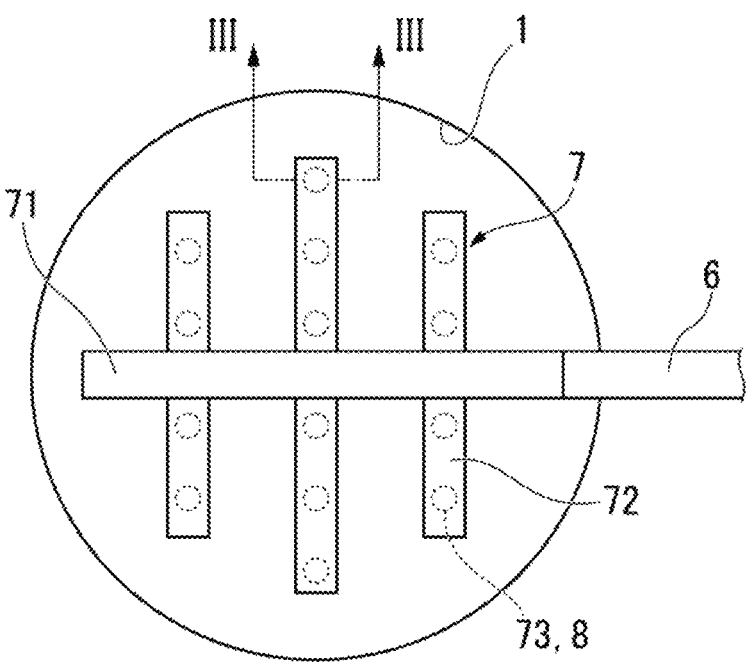
FIG. 2 is a schematic top view of a raw material gas disperser to which a rectifier pipe is attached, which is provided in the device for producing hydrocyanic acid shown in FIG. 1.
Figure 3:
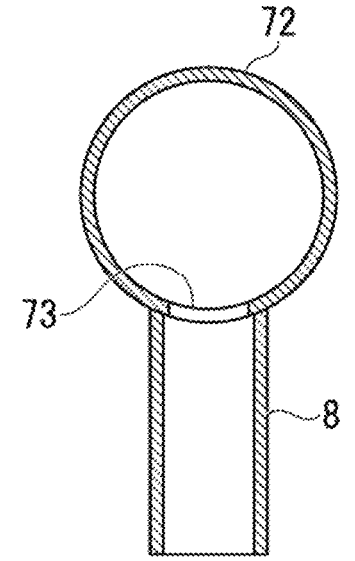
FIG. 3 is a sectional view along line III-III of the raw material gas disperser shown in FIG. 2.

FIG. 1 is a schematic configuration diagram of a device for producing hydrocyanic acid (hereinafter, also referred to as "the present production device") according to an embodiment of the present invention. FIG. 2 is a schematic top view of a raw material gas disperser 7 to which a rectifier pipe 8 is attached, which is provided in the present production device. FIG. 3 is a sectional view along line III-III of the raw material gas disperser shown in FIG. 2.

The present production device includes a fluidized bed reactor 1 accommodating a particulate metal oxide catalyst 2 and performing a vapor phase contact ammoxidation reaction, an oxygen-containing gas supply pipe 3 (oxygen-containing gas supply unit), and an oxygen-containing gas disperser 4, a raw material gas supply pipe 6 (raw material gas supply unit), a raw material gas disperser 7, a rectifier pipe 8, a cyclone 9, a catalyst return pipe 10, and a gas discharge pipe 11.

The oxygen-containing gas disperser 4, the raw material gas disperser 7, the rectifier pipe 8, the cyclone 9, and the catalyst return pipe 10 are each disposed in the fluidized bed reactor 1.

The oxygen-containing gas supply pipe 3 is a pipe that supplies an oxygen-containing gas (for example, air) to the fluidized bed reactor 1. The oxygen-containing gas supply pipe 3 is connected to a bottom of the fluidized bed reactor 1. The raw material gas supply pipe 6 is a pipe that supplies a raw material gas containing methanol. The raw material gas supply pipe 6 is connected below a center of the fluidized bed reactor 1 in a height direction and communicates with the raw material gas disperser 7.

The oxygen-containing gas disperser 4 is disposed above a connection position of the oxygen-containing gas supply pipe 3 of the fluidized bed reactor 1. The oxygen-containing gas disperser 4 vertically partitions the inside of the fluidized bed reactor 1, and is accommodated such that the metal oxide catalyst 2 can fluidly move on the oxygen-containing gas disperser 4.

The raw material gas disperser 7 may be disposed below the center of the fluidized bed reactor 1 in the height direction and above the oxygen-containing gas disperser 4. A height of the raw material gas disperser 7 may be at any position. Two or more raw material gas dispersers 7 may be disposed to divide and supply the raw material gas.

The rectifier pipe 8 is attached to the raw material gas disperser 7.

The cyclone 9 is disposed in the vicinity of a top in the fluidized bed reactor 1.

A first end portion of the catalyst return pipe 10 is connected to the cyclone 9. A second end portion opposite to the first end portion can be opened at any position, and for example, can be opened between the oxygen-containing gas disperser 4 and the raw material gas disperser 7. A flapper valve or a trickle valve may be installed in an opening portion of the catalyst return pipe 10.

The gas discharge pipe 11 is a pipe that discharges gas from the fluidized bed reactor 1. The gas discharge pipe 11 is connected to the top of the fluidized bed reactor 1 and communicates with the cyclone 9.

The cyclone 9 may be a series multi-stage cyclone in which two or more cyclones are connected in series. In a case where the cyclone 9 is a series multi-stage cyclone, the gas discharge pipe 11 communicates with a last stage cyclone among the cyclones constituting the series multi-stage cyclone.

As the metal oxide catalyst 2, a known metal oxide catalyst can be used as the metal oxide catalyst used for the vapor phase contact ammoxidation reaction of methanol in the fluidized bed reactor.

An average particle size of the metal oxide catalyst 2 is preferably 30 to 200 μm. A lower limit of the average particle size is more preferably equal to or more than 40 μm, and an upper limit is more preferably equal to or less than 100 μm.

A bulk density of the metal oxide catalyst 2 is preferably 0.5 to 2 g/cm$^3$. The lower limit of the bulk density is more preferably equal to or more than 0.7 g/cm$^3$, and the upper limit is more preferably equal to or less than 1.5 g/cm$^3$.

The metal oxide catalyst 2 preferably has high activity. For example, a highly active catalyst having a reaction rate constant of 3 s$^{-1}$ or more when the ammoxidation reaction, which is an index of activity, is used as a primary reaction of methanol is preferable.

Preferable examples of the metal oxide catalyst 2 include a metal oxide catalyst containing at least iron, antimony, phosphorus, and vanadium. Such a metal oxide catalyst is excellent in terms of reaction rate and reduction deterioration resistance.

In a metal oxide catalyst containing at least iron, antimony, phosphorus, and vanadium, in view of hydrocyanic acid being reliably obtained at a high yield and a high selection rate over time even if a methanol concentration is increased, when the number of moles of iron in the metal oxide catalyst is 10, the number of moles of vanadium is preferably equal to or more than 0.6, and more preferably has a composition represented by the following Formula (I).

$$Fe_aSb_bP_cV_dMo_eCu_fW_gA_hE_iG_jO_k(SiO_2)_l \qquad (I)$$

Here, Fe, Sb, P, V, Mo, Cu, W, O, and Si represent iron, antimony, phosphorus, vanadium, molybdenum, copper, tungsten, oxygen, and silicon, respectively, A represents at least one element selected from the group consisting of Mg, Zn, La, Ce, Al, Cr, Mn, Co, Ni, Bi, U, and Sn, E represents at least one element selected from the group consisting of B and Te, G represents at least one element selected from the group consisting of Li, Na, K, Rb, Cs, Ca, and Ba, subscripts a, b, c, d, e, f, g, h, i, j, k and l represent atomic ratios, and when a=10 is assumed, b=12 to 30, c=1 to 30, d=0.6 to 3, e=0 to 0.3, f=0 to 5, g=0 to 3, h=0 to 6, i=0 to 5, j=0 to 3, l=0 to 200, and k is an oxygen atomic ratio required to satisfy the atomic valence of each of the elements excluding silicon.

Another preferred example of the metal oxide catalyst 2 is a metal oxide catalyst containing at least molybdenum and bismuth. Such a metal oxide catalyst is excellent in terms of reaction rate and reduction deterioration resistance.

A metal oxide catalyst containing at least molybdenum and bismuth preferably has a composition represented by the following Formula (II), in view of hydrocyanic acid being reliably obtained at a high yield and a high selection rate over time even if the concentration of methanol is increased.

$$Mo_mBi_nFe_oJ_pL_qM_rQ_sO_t(SiO_2)_u \qquad (II)$$

Here, Mo, Bi, Fe, O, and Si represent molybdenum, bismuth, iron, oxygen, and silicon, respectively, J represents at least one element selected from the group consisting of Ni, Co, Zn, Mg, Mn, and Cu, L represents at least one element selected from the group consisting of La, Ce, Pr, Nd and Sm, M represents at least one element selected from the group consisting of Li, Na, K, Rb, and Cs, Q represents at least one element selected from the group consisting of Ca, Sr, Ba, Cd, Ti, Zr, V, Nb, Ta, Cr, W, Ge, Sn, Y, Al, Ga, Ru, Rh, Pd, Re, Os, Ir, Pt, Ag, B, P, Sb, and Te, subscripts m, n, o, p, q, r, s, t, u represent atomic ratios, and when m=12 is assumed, n=0.1 to 5, o=0.1 to 10, p=2 to 12, q=0.01 to 5, r=0.01 to 2, s=0 to 10, u=20 to 200, and t is an oxygen atomic ratio required to satisfy the atomic valence of each of the elements excluding silicon.

As the oxygen-containing gas disperser 4, a known disperser can be used, and examples thereof include a pipe type disperser including a pipe grid type, a cap type disperser, a porous plate type disperser, a perforated plate type disperser, and a parallel slit plate type disperser.

As the raw material gas disperser 7, a pipe type disperser including a pipe grid type disperser can be used.

As shown in FIG. 2, an example of the raw material gas disperser 7 includes a pipe type disperser including a header 71 extending in a first direction (horizontal direction in FIG. 2) and a plurality of branch pipes 72 extending on both sides in a second direction (vertical direction in FIG. 2) orthogonal to the first direction from the header 71. The header 71 communicates with the raw material gas supply pipe 6, and the branch pipe 72 communicates with the header 71.

The branch pipe 72 is formed with a pore 73 that opens toward a lower side when the raw material gas disperser 7 is disposed in the fluidized bed reactor 1.

The header 71 may be formed with the pore 73 that opens toward the lower side when the raw material gas disperser 7 is disposed in the fluidized bed reactor 1. In this case, the branch pipe 72 may not be provided.

The number of pores 73 per unit cross-sectional area of the fluidized bed reactor 1 (hereinafter, also referred to as "number of pores per unit reactor cross-sectional area") is 10 to 45 pieces/m$^2$, and is preferably 20 to 35 pieces/m$^2$. In a case where the number of pores per unit reactor cross-sectional area is within this range, the yield of hydrocyanic acid in the vapor phase contact ammoxidation reaction of methanol is excellent.

The number of pores per unit reactor cross-sectional area is calculated by dividing the number (pieces) of the pores 73 of the raw material gas disperser 7 by the cross-sectional area (m$^2$) of the fluidized bed reactor 1. The number of pores per unit reactor cross-sectional area can be adjusted, for example, by changing the number of branch pipes 72 or the number of pores 73 formed in the header 71 or one branch pipe 72. The branch pipes 72 and the pores 73 are preferably provided at uniform intervals.

Here, the cross-sectional area of the fluidized bed reactor 1 represents the area of the cross section inside the fluidized bed reactor 1 at a height at which the raw material gas disperser 7 is disposed in the fluidized bed reactor 1. In a case where two or more raw material gas dispersers 7 are disposed, the cross-sectional area of the fluidized bed reactor 1 represents an area of the cross section inside the fluidized bed reactor 1 at the height of the raw material gas disperser 7 which is closest to the oxygen-containing gas disperser 4. The cross section is a cross section in a direction orthogonal to the height direction. The cross-sectional area includes a cross-sectional area of an interior article such as the catalyst return pipe 10. The area obtained by subtracting the cross-sectional area of the interior article from the cross-sectional area of the fluidized bed reactor 1 is referred to as an effective cross-sectional area of the fluidized bed reactor.

The cross-sectional area of the fluidized bed reactor 1 can be appropriately selected in a range of 10×10$^{-2}$ to 150 m$^2$, for example.

A ratio of the area of the pores 73 (the total area of the pores 73 in a case where there are a plurality of the pores 73) to the cross-sectional area of the fluidized bed reactor 1 is preferably 0.01 to 0.2 area %, and the lower limit is more preferably equal to or more than 0.03 area % and the upper limit is more preferably equal to or less than 0.1 area %.

In a case where the number of pores per unit reactor cross-sectional area is 10 to 45 pieces/m$^2$, a diameter of the pore 73 is preferably 1 to 12 mm from a viewpoint of the yield of hydrocyanic acid. The lower limit of the diameter of the pores 73 is more preferably equal to or more than 1.5 mm, and the upper limit is equal to or less than 8 mm. In a case where the diameter of the pore 73 is within this range, a pressure loss in the disperser is within an appropriate range, and there is an advantage in terms of the power cost of supplying the raw material gas and the uniform dispersibility of the raw material gas.

In a case where the raw material gas disperser 7 has a plurality of pores 73, the diameters of the plurality of pores 73 may be the same or different.

As shown in FIG. 3, the rectifier pipe 8 is attached to a position of the pore 73 on an outer peripheral surface of the branch pipe 72 and communicates with the branch pipe 72. In a case where the branch pipe 72 is not provided, the rectifier pipe 8 is attached to a position of the pore 73 on an outer peripheral surface of the header 71 and communicates with the header 71.

An inner diameter of the rectifier pipe 8 is equal to or more than a diameter of the pore 73 and is equal to or less than the diameter of the pore 73+20 mm, for example.

A length of the rectifier pipe 8 is 50 to 500 mm, for example.

A production of hydrocyanic acid using the present production device can be carried out by the following procedure, for example.

First, the oxygen-containing gas is supplied from the oxygen-containing gas supply pipe 3 to the bottom of the fluidized bed reactor 1. At this time, the supplied oxygen-containing gas is supplied upward through the oxygen-containing gas disperser 4, the metal oxide catalyst 2 is brought into a fluidized state, and a fluidized bed is formed.

Subsequently, a raw material gas containing methanol and ammonia is supplied from the raw material gas supply pipe 6. The supplied raw material gas is introduced into the branch pipe 72 via the header 71, and is released below the raw material gas disperser 7 from the pore 73. In addition, the raw material gas released from the pore 73 is supplied into the fluidized bed reactor 1 through the rectifier pipe 8. Specifically, the raw material gas released from the pore 73 is blown out from a tip of the rectifier pipe 8 toward a lower side of the raw material gas disperser 7, and then ascends in the fluidized bed reactor 1 while in contact with the metal oxide catalyst 2 in a fluidized state. During this time, methanol in the raw material gas comes into contact with ammonia in the raw material gas and oxygen in the oxygen-containing gas, and hydrocyanic acid (hydrogen cyanide) is generated by a vapor phase contact ammoxidation reaction.

The generated reaction gas containing hydrocyanic acid is introduced into the cyclone 9 together with the metal oxide catalyst 2 entrained in a gas stream. In the cyclone 9, the reaction gas and the metal oxide catalyst 2 are separated. The metal oxide catalyst 2 separated by the cyclone 9 is returned to the fluidized bed reactor 1 through a catalyst return pipe 10, and the reaction gas is discharged from the fluidized bed reactor 1 through a gas discharge pipe 11 from the cyclone 9.

Air is usually used as the oxygen-containing gas. As the oxygen-containing gas, oxygen-enriched air or oxygen gas diluted with an inert gas may be used.

The raw material gas may contain a diluent such as nitrogen, carbon dioxide, and water vapor in addition to methanol and ammonia.

The temperature at which methanol is brought into contact with ammonia and oxygen is preferably 300° C. to 500° C. from a viewpoint of the yield of hydrocyanic acid. The lower limit of the temperature is more preferably equal to or more than 350° C., and further preferably equal to or more than 380° C. In addition, the upper limit is more preferably equal to or less than 470° C. This temperature is obtained by measuring the temperature in the fluidized bed reactor. The measurement location may be a portion above a position (height) of the raw material gas disperser where reaction with the metal oxide catalyst occurs.

The pressure is preferably 0 to 200 kPa from a viewpoint of the yield of hydrocyanic acid. The lower limit of the pressure is more preferably equal to or more than 10 kPa, and the upper limit is more preferably equal to or less than 150 kPa. The pressure is a gauge pressure. This pressure is obtained by measuring the pressure at the top of the fluidized bed reactor.

A molar ratio of oxygen to methanol (oxygen/methanol) in the total gas supplied to the fluidized bed reactor 1 (hereinafter, also referred to as "total supply gas") is preferably 0.8 to 2.0, and more preferably 0.8 to 1.5, from a viewpoint of the yield of hydrocyanic acid. In a case where air is used as the oxygen-containing gas, a molar ratio of air to methanol (air/methanol) is preferably 3.8 to 9.5, and more preferably 3.8 to 7.1, from a viewpoint of the yield of hydrocyanic acid.

A molar ratio of ammonia to methanol (ammonia/methanol) is preferably 0.5 to 10 from a viewpoint of the yield of hydrocyanic acid.

A superficial velocity of the total supply gas is preferably 10 to 200 cm/sec from a viewpoint of the yield of hydrocyanic acid. The lower limit of the superficial velocity of the total supply gas is more preferably equal to or more than 20 cm/sec, and the upper limit is more preferably equal to or less than 100 cm/sec.

The superficial velocity of methanol and the superficial velocity of ammonia are both preferably 1 to 30 cm/sec. The lower limit of the superficial velocity of methanol and the superficial velocity of ammonia are both more preferably equal to or more than 2 cm/sec, and the upper limit is more preferably equal to or less than 20 cm/sec.

The superficial velocity of oxygen is preferably 2 to 42 cm/sec. The lower limit of the superficial velocity of oxygen is more preferably equal to or more than 4 cm/sec, and the upper limit is more preferably equal to or less than 21 cm/sec. In a case where air is used as the oxygen-containing gas, the superficial velocity of air is preferably 10 to 200 cm/sec. The lower limit of the superficial velocity of air is more preferably equal to or more than 20 cm/sec, and the upper limit is more preferably equal to or less than 100 cm/sec.

The definition of the superficial velocity is as will be described later in examples.

According to the method for producing hydrocyanic acid according to the present invention, the yield of the hydrocyanic acid can be improved.

The reason why the yield of hydrocyanic acid is improved is considered as follows.

In the vapor phase contact ammoxidation reaction of methanol in the fluidized bed reactor 1, a distribution state of methanol in the fluidized bed reactor 1 and a contact state between the raw material gas and the metal oxide catalyst 2 affect the yield of hydrocyanic acid.

In a case where the number of pores per unit reactor cross-sectional area is too small, the distribution of methanol in the fluidized bed reactor 1 becomes non-uniform. Due to the non-uniform distribution of methanol, a region in which oxygen is relatively insufficient with respect to methanol and a large amount of methanol remains unreacted, and a region in which oxygen is relatively excessive with respect to methanol and a large amount of by products are generated are generated in the fluidized bed reactor 1, and thus the yield of hydrocyanic acid in the entire fluidized bed reactor becomes low.

On the other hand, if the number of pores per unit reactor cross-sectional area is too large, bubbles of the raw material gas released from adjacent pores 73 are coalesced and the bubble diameter becomes large. As a result, the contact between the raw material gas and the metal oxide catalyst 2 becomes poor, and the yield of hydrocyanic acid becomes low.

It is considered that by setting the number of pores per unit reactor cross-sectional area within the range of the present invention, the distribution state of methanol in the fluidized bed reactor 1 can be made uniform, and the contact state between the raw material gas and the metal oxide catalyst 2 can be made favorable, and thus the yield of hydrocyanic acid is improved.

In particular, it is possible to rectify the raw material gas by supplying the raw material gas released from the pore 73 to the fluidized bed reactor 1 through the rectifier pipe 8, and it is possible to prevent particles of the metal oxide catalyst from being pulverized by reducing the flow velocity of the raw material gas.

According to the examination by the present inventors, in the vapor phase contact ammoxidation reaction of methanol and the vapor phase contact ammoxidation reaction of a raw material other than methanol, an optimum value of the number of pores per unit reactor cross-sectional area for improving the yield becomes different.

Hereinabove, the present invention has been described with reference to embodiments, but the present invention is not limited to these embodiments. For example, each configuration thereof and a combination thereof in the embodiments described above are examples, and configurations can be added, omitted, and substituted, and other changes can be made without departing from the gist of the present invention.

For example, in the embodiments, an example in which a pipe type disperser is used as the raw material gas disperser 7 is shown, but as long as the raw material gas disperser 7 has the number of pores per unit reactor cross-sectional area within the appropriate range, and any known disperser other than a pipe type disperser may be used. Examples of the disperser other than the pipe type disperser include a cap type disperser, a porous plate type disperser, a perforated plate type disperser, and a parallel slit plate type disperser. The raw material gas disperser 7 is preferably a pipe type disperser because the pipe type disperser is excellent in that clogging of the catalyst can be suppressed and that the structure is simple.

In the embodiments, an example is shown in which a raw material gas containing ammonia together with methanol which is a target (raw material) of vapor phase contact ammoxidation is used, and methanol and ammonia are supplied to the fluidized bed reactor 1, but methanol and ammonia may be supplied separately. For example, a gas supply pipe and a gas disperser for the ammonia-containing gas is provided, and may supply the ammonia-containing gas into the fluidized bed reactor 1 separately from the methanol. It is preferable to use a raw material gas containing methanol and ammonia because methanol and ammonia can be reliably mixed.

In addition, a gas supply pipe and a gas disperser for the oxygen-containing gas may be provided at a position other than the bottom of the fluidized bed reactor 1, and supply the oxygen-containing gas into the fluidized bed reactor 1, for example. From a viewpoint of fluidization of the metal oxide catalyst 2, it is preferable to supply the oxygen-containing gas from the bottom of the fluidized bed reactor 1.

A cooling pipe may be provided in the fluidized bed reactor 1. By providing the cooling pipe, it is possible to easily control the temperature inside the fluidized bed reactor 1 within the optimum temperature range of the vapor phase contact ammoxidation reaction. Therefore, the raw material gas containing a high concentration of methanol can be treated, and the productivity is improved.

Examples of the cooling pipe include a vertical cooling pipe, a horizontal cooling pipe, and a spiral cooling pipe.

In addition, in order to favorably maintain a fluidized state of the metal oxide catalyst 2, and from a viewpoint of construction and maintenance, another interpolation article may be appropriately provided in the fluidized bed reactor 1.

EXAMPLES

Hereinafter, the present invention will be described in more detail with reference to examples, but the following examples do not limit the scope of the present invention.

The superficial velocity (gas flow velocity) and hydrocyanic acid yield in the present specification are defined as follows.

$$\text{Superficial velocity [cm/sec]} = \text{volume velocity of supply gas under reaction conditions } [cm^3/sec] / \text{effective cross-sectional area of fluidized bed reactor } [cm^2]$$

$$\text{Yield of hydrocyanic acid [\%]} = (\text{mass of carbon in generated hydrocyanic acid [kg]/mass of carbon in supplied methanol [kg]}) \times 100$$

Here, the effective cross-sectional area of the fluidized bed reactor represents an area obtained by subtracting a cross-sectional area of the interior article such as the catalyst return pipe 10 from a cross-sectional area of a portion in which the reaction between the raw material gas and the metal oxide catalyst 2 occurs in the fluidized bed reactor 1.

In the production of hydrocyanic acid, a catalyst (I-1) in which the experimental formula is $Fe_{10}Sb_{19}P_6V_1Cu_{2.5}Mo_{0.1}O_X(SiO_2)_{60}$ (here, X is a number determined according to the atomic valence of constituent metals) was used. The catalyst (I-1) was prepared as follows.

(1) 247.3 g of antimony trioxide powder was weighed.

(2) 385 mL of nitric acid and 480 mL of water were mixed and heated, and 49.9 g of electrolytic iron powder was added little by little to dissolve the mixture. Subsequently, 54.0 g of copper nitrate was added to this solution and dissolved.

(3) 10.5 g of ammonium metavanadate and 1.6 g of ammonium paramolybdate were dissolved in 300 mL of water.

(4) 1,590 g of silica sol (SiO$_2$: 20% by mass) was weighed.

(5) The silica sol of (4), the powder of (1), and the solution obtained in (3) were added to the solution obtained in (2) in that order while stirring, and the pH2 was adjusted to 2 with ammonia water having a concentration of 15% by mass. The slurry was heat-treated at 98° C. for 3 hours while stirring, and then 61.8 g of phosphoric acid (content 85% by mass) was added to the slurry and stirred well. Subsequently, this slurry was spray-dried using a rotary disk type spray-drying device. The obtained fine spherical particles were fired at 200° C. for 2 hours and at 500° C. for 3 hours, and further fired at 800° C. for 3 hours to obtain a catalyst (I-1).

Example 1

The production of hydrocyanic acid by the vapor phase contact ammoxidation reaction of methanol was carried out by the following procedure using a production device having the configuration shown in FIG. 1. Here, as the raw material gas disperser, one having a pore formed in the header was used. Table 1 shows the vapor-phase contact ammoxidation reaction conditions of methanol in Example 1. In Table 1, "G" of "kPaG" represents a gauge pressure (the same applies hereinafter).

The fluidized bed reactor 1 was filled with 60 kg of the catalyst (I-1), air was supplied from the oxygen-containing gas supply pipe 3, and a mixed gas (raw material gas) of methanol and ammonia was supplied from the raw material gas supply pipe 6 to perform a reaction. At this time, a molar ratio of oxygen/methanol in the air was adjusted to 1.4 (a molar ratio of air/methanol was adjusted to 6.5), a molar ratio of ammonia/methanol was adjusted to 1, the superficial velocity of the total supply gas was adjusted to 50 cm/sec, the superficial velocity of oxygen was adjusted to 8.2 cm/sec (the superficial velocity of air was adjusted to 38.2 cm/sec), the superficial velocity of methanol and the superficial velocity of ammonia were adjusted to 5.9 cm/sec, the temperature was adjusted to 430° C., and the pressure was adjusted to 50 kPa at a gauge pressure.

After supplying the raw material gas, it was confirmed that the reaction gas composition was stable, and the yield of hydrocyanic acid was calculated from the measurement result of the reaction gas composition at that time and used as a first reaction (run1). Subsequently, in order to confirm the reproducibility, the reaction gas composition was measured again to calculate the yield of hydrocyanic acid, and was used as a second reaction (run2). The yield of hydrocyanic acid in Example 1 is also described in Table 1.

Example 2

After the reaction of Example 1, only the temperature was changed from 430° C. to 439° C. After changing the temperature, it was confirmed that the reaction gas composition was stable, and the yield of hydrocyanic acid was calculated from the measurement result of the reaction gas composition at that time and used as the first reaction (run1). Subsequently, in order to confirm the reproducibility, the reaction gas composition was measured again to calculate the yield of hydrocyanic acid, and was used as a second reaction (run2). The yield of hydrocyanic acid in Example 2 is also described in Table 1.

Comparative Example 1

The production of hydrocyanic acid by vapor phase contact ammoxidation of methanol was carried out by the following procedure using a production device having the configuration shown in FIG. 1. Here, as the raw material gas disperser, one having three pores formed in the header was used.

The production of hydrocyanic acid was performed in the same manner as in Example 1 except that the production conditions were changed as shown in Table 1, and after supplying the raw material gas, it was confirmed that the reaction gas composition was stable, and the yield of hydrocyanic acid was calculated from the measurement result of the reaction gas composition at that time and was used as a first reaction (run1). Subsequently, in order to confirm the reproducibility, the reaction gas composition was measured again to calculate the yield of hydrocyanic acid, and was used as a second reaction (run2). The yield of hydrocyanic acid in Comparative Example 1 is also described in Table 1.

Comparative Example 2

After the reaction of Comparative Example 2, only the temperature was changed as shown in Table 1. After changing the temperature, it was confirmed that the reaction gas composition was stable, and the yield of hydrocyanic acid was calculated from the measurement result of the reaction gas composition at that time and used as the first reaction (run1). Subsequently, in order to confirm the reproducibility, the reaction gas composition was measured again to calculate the yield of hydrocyanic acid, and was used as a second reaction (run2). The yield of hydrocyanic acid in Comparative Example 2 is also described in Table 1.

TABLE 1

| | | Example 1 | | Example 2 | | Comparative Example 1 | | Comparative Example 2 | |
|---|---|---|---|---|---|---|---|---|---|
| | | run1 | run2 | run1 | run2 | run1 | run2 | run1 | run2 |
| Superficial velocity of total supply gas | cm/sec | 50 | 50 | 50 | 50 | 50 | 50 | 50 | 50 |
| Inner diameter of reactor | mm | 210.7 | 210.7 | 210.7 | 210.7 | 210.7 | 210.7 | 210.7 | 210.7 |
| Number of pores | pieces | 1 | 1 | 1 | 1 | 3 | 3 | 3 | 3 |
| Number of pores per unit reactor cross-sectional area | pieces/m$^2$ | 29 | 29 | 29 | 29 | 86 | 86 | 86 | 86 |
| Diameter of pore | mm | 2.5 | 2.5 | 2.5 | 2.5 | 2.5 | 2.5 | 2.5 | 2.5 |
| Temperature | ° C. | 430 | 430 | 439 | 439 | 428 | 428 | 439 | 439 |
| Amount of catalyst | kg | 60 | 60 | 60 | 60 | 60 | 60 | 60 | 60 |
| Pressure | kPaG | 50 | 50 | 50 | 50 | 50 | 50 | 50 | 50 |
| Molar ratio of oxygen/methanol | — | 1.4 | 1.4 | 1.4 | 1.4 | 1.4 | 1.4 | 1.4 | 1.4 |

TABLE 1-continued

| | | Example 1 | | Example 2 | | Comparative Example 1 | | Comparative Example 2 | |
|---|---|---|---|---|---|---|---|---|---|
| | | run1 | run2 | run1 | run2 | run1 | run2 | run1 | run2 |
| Molar ratio of ammonia/methanol | — | 1 | 1 | 1 | 1 | 1 | 1 | 1 | 1 |
| Yield of hydrocyanic acid | % | 88.4 | 88.6 | 88.2 | 88.2 | 87.3 | 87.0 | 86.9 | 87.0 |

Figure 4:
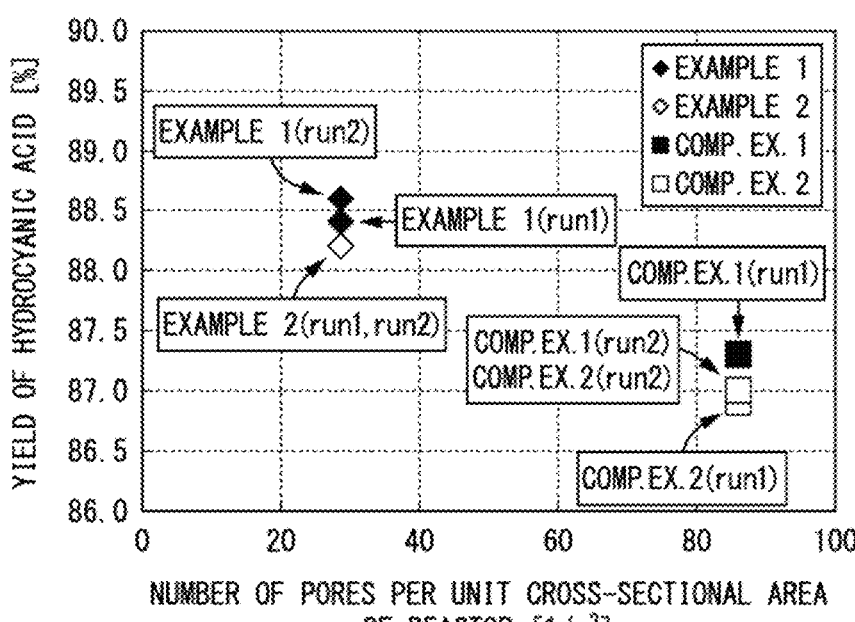
FIG. 4 is a graph showing results of Examples 1 and 2 and Comparative Examples 1 and 2.

FIG. 4 shows the relationship between the number of pores per unit reactor cross-sectional area and the yield of hydrocyanic acid in each of Examples 1 and 2 and Comparative Examples 1 and 2.

As can be seen from Table 1, the reaction conditions of Example 1 and Comparative Example 1 and the reaction conditions of Example 2 and Comparative Example 2 are almost the same except for the number of pores per unit cross-sectional area of the fluidized bed reactor.

However, as can be seen from FIG. 4, Examples 1 and 2 in which the number of pores per unit reactor cross-sectional area was 10 to 45 pieces/m$^2$ had a higher yield of hydrocyanic acid than Comparative Examples 1 and 2 in which the number of pores per unit cross-sectional area of the fluidized bed reactor was 45 pieces/m$^2$.

That is, according to the present invention, it was confirmed that the yield of hydrocyanic acid in the vapor phase contact ammoxidation reaction of methanol was improved.

REFERENCE SIGNS LIST

1: Fluidized bed reactor
2: Metal oxide catalyst
3: Oxygen-containing gas supply pipe
4: Oxygen-containing gas disperser
6: Raw material gas supply pipe (raw material gas supply unit)
7: Raw material gas disperser
8: Rectifier pipe
9: Cyclone
10: Catalyst return pipe
11: Gas discharge pipe
71: Header
72: Branch pipe
73: Pore

What is claimed is:

1. A device comprising:
a fluidized bed reactor configured to accommodate a metal oxide catalyst and to perform a vapor phase contact ammoxidation reaction,
one or more raw material gas dispersers disposed in the fluidized bed reactor, and
a raw material gas supply unit configured to supply a raw material gas containing methanol to the raw material gas disperser,
wherein the raw material gas disperser comprises a pipe disperser including:
a header extending in a horizontal direction,
a plurality of branch pipes attached to the header,
a plurality of rectifier pipes attached to one of the plurality of branch pipes,
one or more pores formed at at least one of the plurality of rectifier pipes configured to release the raw material gas into the fluidized bed reactor through the rectifier pipes, and a number of pores per unit cross-sectional area of the fluidized bed reactor is 10 to 45 pieces/m$^2$.

2. The device according to claim 1, wherein the raw material gas contains methanol and ammonia.

3. The device according to claim 1, the device further comprising:
an oxygen-containing gas supply unit configured to supply an oxygen-containing gas from a bottom of the fluidized bed reactor.

4. The device according to claim 1, wherein the number of pores per unit cross-sectional area of the fluidized bed reactor is 20 to 35 pieces/m$^2$.

5. The device according to claim 1, wherein a diameter of the pore is 1 to 12 mm.

6. A method for producing hydrocyanic acid, comprising:
obtaining hydrocyanic acid by a vapor phase contact ammoxidation reaction by supplying a raw material gas containing methanol in a fluidized bed reactor through a raw material gas disperser disposed in the fluidized bed reactor, and
bringing the methanol into contact with ammonia and oxygen in the presence of a metal oxide catalyst,
wherein the raw material gas disperser comprises a pipe disperser including:
a header extending in a horizontal direction,
a plurality of branch pipes attached to the header,
a plurality of rectifier pipes attached to one of the plurality of branch pipes,
one or more pores formed at at least one of the plurality of rectifier pipes configured to release the raw material gas into the fluidized bed reactor through the rectifier pipes, and
a number of pores per unit cross-sectional area of the fluidized bed reactor is 10 to 45 pieces/m$^2$.

7. The method according to claim 6, wherein the number of pores per unit cross-sectional area of the fluidized bed reactor is 20 to 35 pieces/m$^2$.

8. The method according to claim 6, wherein a diameter of the pore is 1 to 12 mm.

9. The method according to claim 6, wherein the raw material gas contains methanol and ammonia.

10. The method according to claim 6, wherein an oxygen-containing gas is supplied from a bottom of the fluidized bed reactor.

11. The method according to claim 6, wherein the metal oxide catalyst contains at least iron, antimony, phosphorus, and vanadium.

12. The method according to claim 6, wherein a number of moles of vanadium is equal to or more than 0.6 when a number of moles of iron in the metal oxide catalyst is 10.

13. The method according to claim 6, wherein the metal oxide catalyst has a composition represented by the following Formula (I):

$$Fe_aSb_bP_cV_dMo_eCu_fW_gA_hE_iG_jO_k(SiO_2)_l \qquad (1)$$

wherein Fe, Sb, P, V, Mo, Cu, W, O, and Si represent iron, antimony, phosphorus, vanadium, molybdenum, copper, tungsten, oxygen, and silicon, respectively, A represents at least one element selected from the group consisting of Mg, Zn, La, Ce, Al, Cr, Mn, Co, Ni, Bi, U, and Sn, E represents at least one element selected from the group consisting of B and Te, G represents at least one element selected from the group consisting of Li, Na, K, Rb, Cs, Ca, and Ba, subscripts a, b, c, d, e, f, g, h, i, j, k and l represent atomic ratios, and a is 10, b=12 to 30, c=1 to 30, d=0.6 to 3, e=0 to 0.3, f=0 to 5, g=0 to 3, h=0 to 6, i=0 to 5, j=0 to 3, l=0 to 200, and k is an oxygen atomic ratio required to satisfy the atomic valence of each of the elements excluding silicon.

14. The method according to claim 6, wherein the metal oxide catalyst contains at least molybdenum and bismuth.

15. The method according to claim 14, wherein the metal oxide catalyst has a composition represented by the following Formula (II):

$$Mo_mBi_nFe_oJ_pL_qM_rQ_sO_t(SiO_2)_u \qquad \text{(II)}$$

wherein Mo, Bi, Fe, O, and Si represent molybdenum, bismuth, iron, oxygen, and silicon, respectively, J represents at least one element selected from the group consisting of Ni, Co, Zn, Mg, Mn, and Cu, L represents at least one element selected from the group consisting of La, Ce, Pr, Nd and Sm, M represents at least one element selected from the group consisting of Li, Na, K, Rb, and Cs, Q represents at least one element selected from the group consisting of Ca, Sr, Ba, Cd, Ti, Zr, V, Nb, Ta, Cr, W, Ge, Sn, Y, Al, Ga, Ru, Rh, Pd, Re, Os, Ir, Pt, Ag, B, P, Sb, and Te, subscripts m, n, o, p, q, r, s, t, u represent atomic ratios, and m is 12, n=0.1 to 5, o=0.1 to 10, p=2 to 12, q=0.01 to 5, r=0.01 to 2, s=0 to 10, u=20 to 200, and t is an oxygen atomic ratio required to satisfy the atomic valence of each of the elements excluding silicon.

16. The method according to claim 6, wherein the methanol is brought into contact with ammonia and oxygen at a temperature of 300° C. to 500° C.

17. The method according to claim 6, wherein the methanol is brought into contact with ammonia and oxygen at a gauge pressure of 0 to 200 kPa.

* * * * *